June 18, 1940.  W. F. A. BUEHNER  2,204,790
AUTOMOBILE LICENSE PLATE LOCK
Filed Aug. 31, 1939
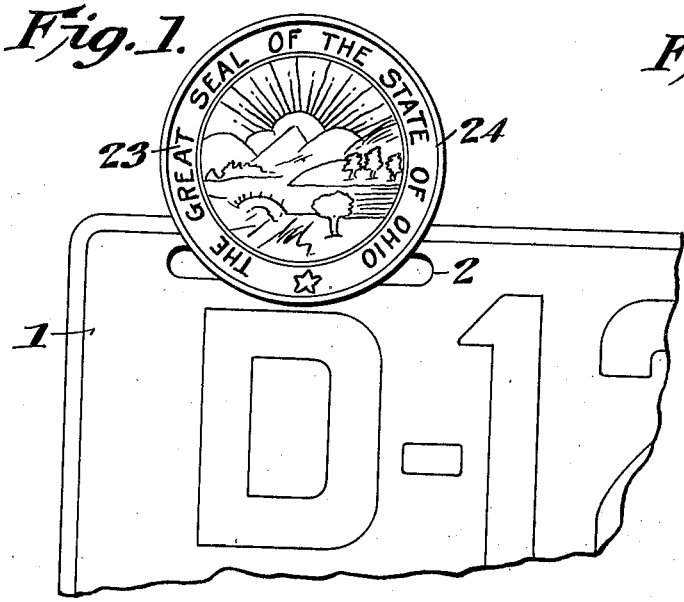
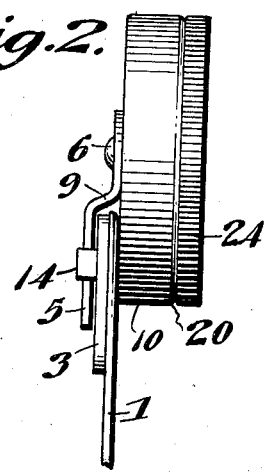
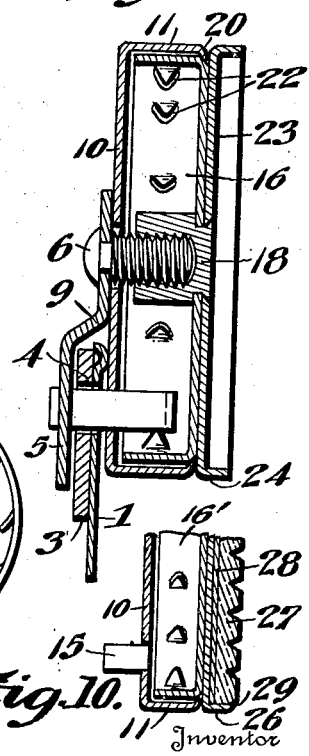
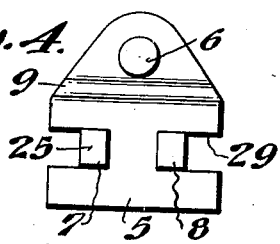
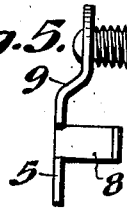
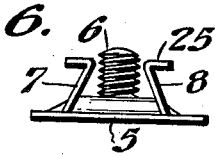
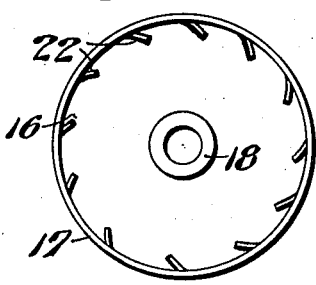
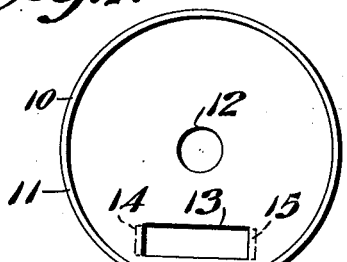
Inventor
William F. A. Buehner
By Lloyd W. Patel
Attorney Patented June 18, 1940

2,204,790

UNITED STATES PATENT OFFICE 2,204,790

AUTOMOBILE LICENSE PLATE LOCK

William F. A. Buehner, New York, N. Y.

Application August 31, 1939, Serial No. 292,954

7 Claims. (Cl. 40—125)

This invention relates to automobile license plate locks, and particularly to a device of this character intended and adapted to be applied by the car owner to mount the license plates upon the usual supporting bracket, and to at the same time lock and secure the plates so that the plates cannot be removed without destruction of or noticeable damage to the locking means.

Another object is to provide a locking device of this character that can be provided with an imprint or stamping of a state seal, or with other particular and desired identifying matter or mounting, and which is so located when in use that the matter or marking will be prominently displayed.

A further object is to so construct the parts that they can be simply and inexpensively manufactured and can consequently be supplied to a state or local government, association, or other organization, or to individual users, at low cost, thereby justifying employment of a lock that must be destroyed or defaced beyond possibility of proper reuse, for removal.

Still another object is to provide a device of this character comprising only two separate parts or unitary structures, that can be readily applied to hold the license plate in place, and can be locked by manual manipulation of a single part, and without the use of any tools or appliances.

Yet a further object is to so construct the parts that when the locking device is applied the license plate is securely clamped and is rigidly held against and upon the usual license mounting bracket of an automobile, in such manner that the license plate cannot be lost or become loosened and rattle.

With the above and other objects in view, some of which will be apparent to those skilled in the art, and others of which are inherent in the construction and arrangement of the parts and in the manner of association and use, my invention includes certain novel features of construction and combinations and arrangements of parts which will be hereinafter set forth in connection with the drawing and then pointed out in the claims.

In the drawing:

Figure 1 is a fragmental elevational view of one corner of an automobile license plate showing my invention applied and in use.

Fig. 2 is an end edge elevation.

Fig. 3 is an enlarged vertical sectional view through the lock structure and associated portions of the license plate and mounting bracket.

Fig. 4 is a view in front elevation of the back locking plate.

Fig. 5 is a view in end edge elevation of the back locking plate.

Fig. 6 is a top elevational view of the locking plate.

Fig. 7 is a front elevational view of the lock housing in unassembled relation.

Fig. 8 is a transverse sectional view through the lock housing.

Fig. 9 is a view in elevation looking into the locking cap before assembly.

Fig. 10 is a fragmentary sectional view showing a modified construction of locking cap.

In the present disclosure I have shown the automobile license plate 1 as of usual and ordinary construction, being provided with an opening or slot 2 to receive the fastenings by which the license plate is secured on a mounting bracket 3, provided with a registering opening 4 to also receive the fastening.

The back locking plate 5 is made of any suitable size or material, and in its upper portion has an externally screw-threaded locking bolt 6 riveted or welded or otherwise secured in place to extend from its forward face and be unitarily mounted and securely held against possibility of displacement or removal without necessity for destruction or irreparable damage to the parts. In its lower part the back locking plate is provided with the forwardly extending spaced prongs 7 and 8 adapted to be received through the registering fastener receiving openings 2 and 4 of the license plate 1 and the mounting bracket. The back locking plate is made of sufficient size that the locking bolt 6 is somewhat above the upper edge of the license plate 1 when the prongs 7 and 8 are fitted through the opening 2, and this back locking plate is preferably somewhat offset, as at 9, so that the face portion from which the locking bolt 6 extends will be substantially in the same plane with the forward face of the license plate 1.

A lock housing 10 is made to be substantially cup-shaped, with its annular side wall 11 disposed concentrically around an opening 12 adapted to freely receive the locking bolt 6. This lock housing has an opening 13 therethrough located to receive the prongs 7 and 8 when the housing is fitted in place with the locking bolt 6 passing through the opening 12, and the housing has prongs 14 and 15 extending rearwardly at opposite ends of the opening 13 so that these prongs 14 and 15 will fit through the aligned openings 2 and 4 of the license plate and mounting bracket 1 and 3, to thus hold the lock housing 10 against rotational movement and to guard the shield or guard the prongs 7 and 8 of the back locking plate against being tampered with.

A locking cap 16, also of substantially cup-shaped form, has its annular rim flange 17 of such diameter that it will fit and turn freely within the flange 7 of the housing 10, and at its center this locking cap carries an internally screw threaded locking sleeve 18 threaded to turn and tighten upon the locking bolt 6. The locking cap 16 is unitarily assembled with the lock housing 10 by having the annular flange 17 fitted into the larger flange 11 of the housing 10, and the edge 19 of the flange 11 is then spun or turned down, as best illustrated at 20 in Fig. 3, so that the locking cap 16 is swivelled and mounted within the lock housing 10 with the threaded opening of the sleeve 18 axially centered with respect to the opening 12 and consequently positioned to be turned onto the locking bolt 6 when the locking bolt is inserted through the opening 12 and the prongs 14 and 15 are fitted through the aligned openings of the license plate and mounting bracket.

The locking cap 16 has a plurality of pawl-like prongs 22 cut and stamped from the annular rim 17 thereof to extend inwardly within the rim or flange in position to engage with the prongs 7 and 8 of the back locking plate 5 substantially after the manner of locking dogs.

In the main embodiment I have shown a cup-like member 23 mounted on the outer side of the head of the locking cap and provided with a knurled, milled, or otherwise roughened outer surface 24 on the flange thereof. This member 23 is in the present instance shown as riveted upon and unitarily connected with the locking cap 16 and the locking sleeve 18, although it will be appreciated that the parts can be welded together or can be otherwise suitably associated and connected together. It will be seen that the roughened surface 24 of the member 23 is presented in position to be readily grasped and used in rotating the locking cap; and also, this cup-like member 23 will serve to receive and protect a representation of a state seal or other matter or indication imprinted or stamped or mounted or otherwise shown within the rim flange.

As best shown in Fig. 6, it is perhaps preferable that the prongs 7 and 8 be provided at their inner ends with flange portions 25 that will fit on the far sides of the pawl-like prongs when the locking cap 16 is screwed or turned into place, and these flange portions 25 will also serve to engage at the sides of the opening 13 should any attempt be made to pry the back plate and the housing apart.

In the modified construction illustrated in Fig. 10, the locking cap 16' is constructed in substantially the same manner as the cap 16, and the cup-like member 26 is secured to this locking cap 16' and has its open side presented outwardly substantially after the manner of cup-like member 23, as described above. In the open side of the member 26, I mount a reflector 27, of glass or other suitable material, and of any desired type and construction. In some instances it may be desirable to place a backing or a packing behind the reflector, as indicated at 28. The edge of the annular flange of the member 26 can be spun or pressed down to hold the reflector 27 in place.

As the locking cap 16, or a modified form of locking cap, is tightened into place the lock housing 10 is moved toward the back locking plate 5, and the prongs 14 and 15 of the housing are extended through the aligned openings 2 and 4 of the license plate 1 and the mounting bracket 3 and move into the notches 29 of the back plate 5 where they overlie and protect the prongs 7 and 8 of the back locking plate. The portion of the housing 10 adjacent to the opening 13 will be clamped against the outer face of the license plate 1, and in consequence the license plate is securely mounted and clamped upon the mounting bracket 3 and the parts are assembled and held together against removal by manual manipulation or by the use of tools, without cutting away or bending or other irreparable destruction of some of the parts.

This form of locking device can be used upon and in connection with the license plates of practically all states or other license plate issuing agencies, and is capable of application to the mounting brackets of automobiles as now ordinarily manufactured. When the license lock is in use it is mounted in such location that it will not obscure any part of the license plate, and at the same time will separately show a state seal or other indicating matter in spacing adjacent to the matter of the license plate but distinctly separate and distinguishable therefrom.

While I have herein shown and described only certain specific embodiments of my invention and have suggested only certain possible modifications, it will be understood and appreciated that changes and variations can be made in the form and construction of the parts, the material from which they are made, and in the manner of mounting and assembling or associating the parts, without departing from the spirit and scope of my invention.

I claim:

1. An automobile license plate lock comprising, a back locking plate having prong structure receivable through aligned openings of a license plate and mounting bracket and provided with a locking bolt extending from its forward side and spaced from the prong structure, a lock housing having openings adapted to receive the prong structure and the locking bolt, and locking means rotatable within the lock housing adapted to be turned and tightened upon the locking bolt and having parts adapted to engage the prong structure to hold the locking means against being reversely turned and loosened.

2. An automobile license plate lock comprising, a locking plate having prong structure receivable through an opening of the plate to be locked, a locking bolt extending on the forward side of said plate, a lock housing having openings adapted to receive the locking bolt and the prong structure, a locking cap revolubly mounted in the housing provided with a threaded sleeve adapted to be turned and tightened upon the locking bolt, and prong means on said locking cap adapted to engage with the prongs of the back locking plate to hold the locking cap against being reversely turned and loosened.

3. An automobile license plate lock comprising, a back locking plate having prong structure extending forwardly adjacent to a lower edge receivable in a fastening opening of the license plate, a locking bolt extending forwardly from said back plate above the prong structure, a lock housing having openings adapted to receive the locking bolt and the prong structure thereby holding the housing against rotation on said bolt, a locking cap rotatable within the housing having a threaded sleeve adapted to be turned and tightened upon the locking bolt, and pawl-like prongs on said locking cap adapted to engage with the prong structure of the back plate to restrain the locking cap against being reversely turned and loosened.

4. An automobile license plate lock comprising, a back locking plate having a pair of prongs extending forwardly adjacent to its lower end, a locking bolt extending forwardly from said plate at a point spaced above the prongs, a lock housing provided with openings to receive the locking bolt and the prongs of the back plate and having an annular flange substantially concentrically around the bolt-receiving opening, a locking cap swiveled in the flange of the housing provided with a threaded sleeve adapted to be turned and tightened upon the locking bolt, and pawl-like prongs on said locking cap adapted to engage with the prongs of the back plate to hold the locking cap against being reversely turned for loosening.

5. An automobile license plate lock comprising, a back locking plate having a pair of prongs extending forwardly adjacent to its lower end, a locking bolt extending forwardly from said plate at a point spaced above the prongs, a lock housing provided with openings adapted to receive the locking bolt and the prongs of the back plate and having an annular flange substantially concentrically around the bolt-receiving opening, a locking cap swiveled in the flange of the housing provided with a threaded sleeve adapted to be turned and tightened upon the locking bolt, pawl-like prongs on said locking cap adapted to engage with the prongs of the back plate to hold the locking cap against being reversely turned for loosening, and flange portions extending outwardly on outer sides of the prongs of the back plate and positioned within the lock housing when the parts are assembled.

6. An automobile license plate lock comprising, a back locking plate having a pair of prongs extending forwardly therein, a locking bolt extending forwardly from said plate at a point spaced from the prongs, a lock housing provided with openings adapted to receive the locking bolt and the prongs of the back plate and having an annular flange substantially concentrically around the bolt-receiving opening, a locking cap swiveled in the flange of the housing provided with a threaded sleeve adapted to be turned and tightened upon the locking bolt, pawl-like prongs on said locking cap engaging with the prongs of the back plate to hold the locking cap against being reversely turned for loosening, and extensions on the prongs of the back plate adapted to engage behind the pawl-like prongs of the locking cap for holding the prongs of the back plate against being withdrawn.

7. An automobile license plate lock comprising, a back locking plate having prongs extending forwardly, a locking bolt extending forwardly from said plate at a point spaced from the prongs, a lock housing provided with openings adapted to receive the locking bolt and the prongs of the back plate and having an annular flange substantially concentrically around the bolt-receiving opening, a locking cap swiveled in the flange of the housing provided with a threaded sleeve adapted to be turned and tightened upon the locking bolt, said locking cap having an annular flange revoluble within the flange of the housing and adjacent to the prongs of the back plate, and pawl-like prongs extending from said annular flange of the locking cap riding over the prongs of the back plate for tightening movement of the locking cap and engageable with the prongs of the back plate to restrain rotation of the locking cap for loosening of the sleeve from the locking bolt.

WILLIAM F. A. BUEHNER.